Figure 1:
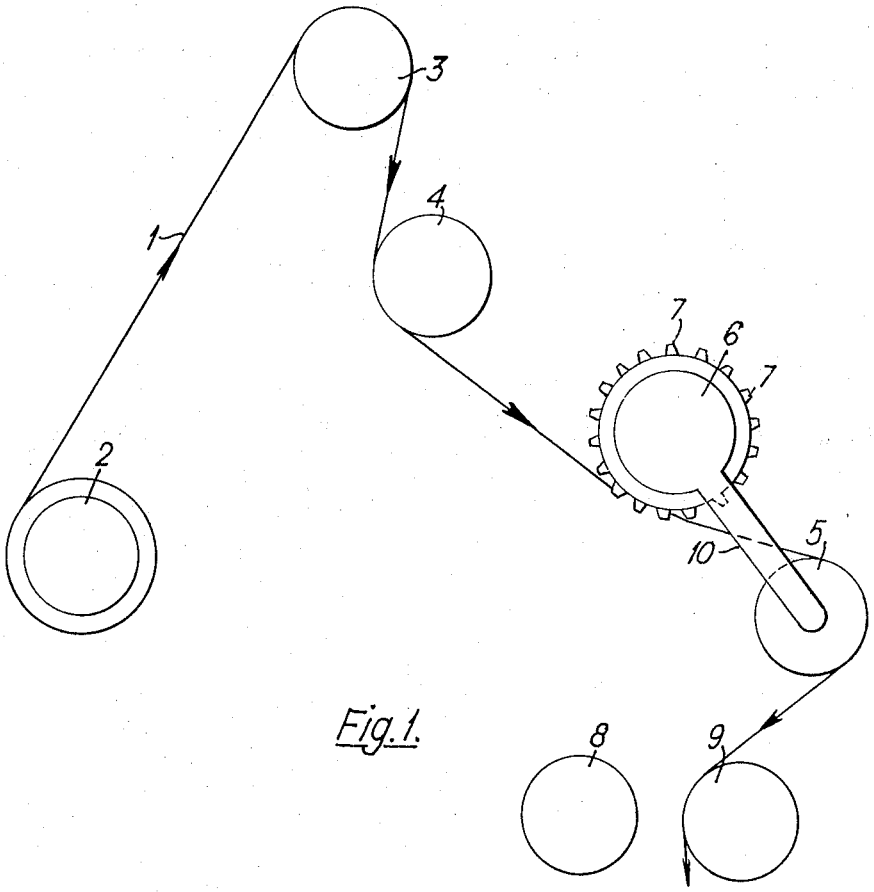
Figure 2:
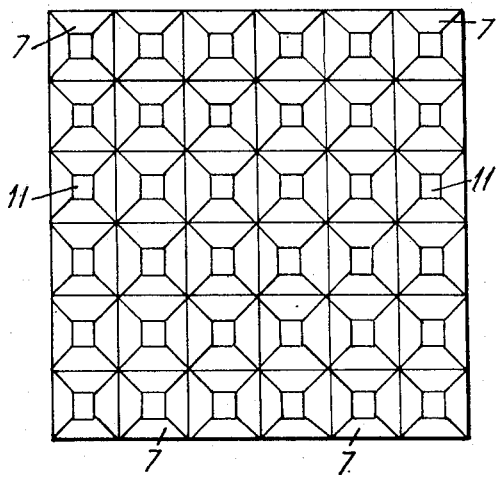
Figure 3:
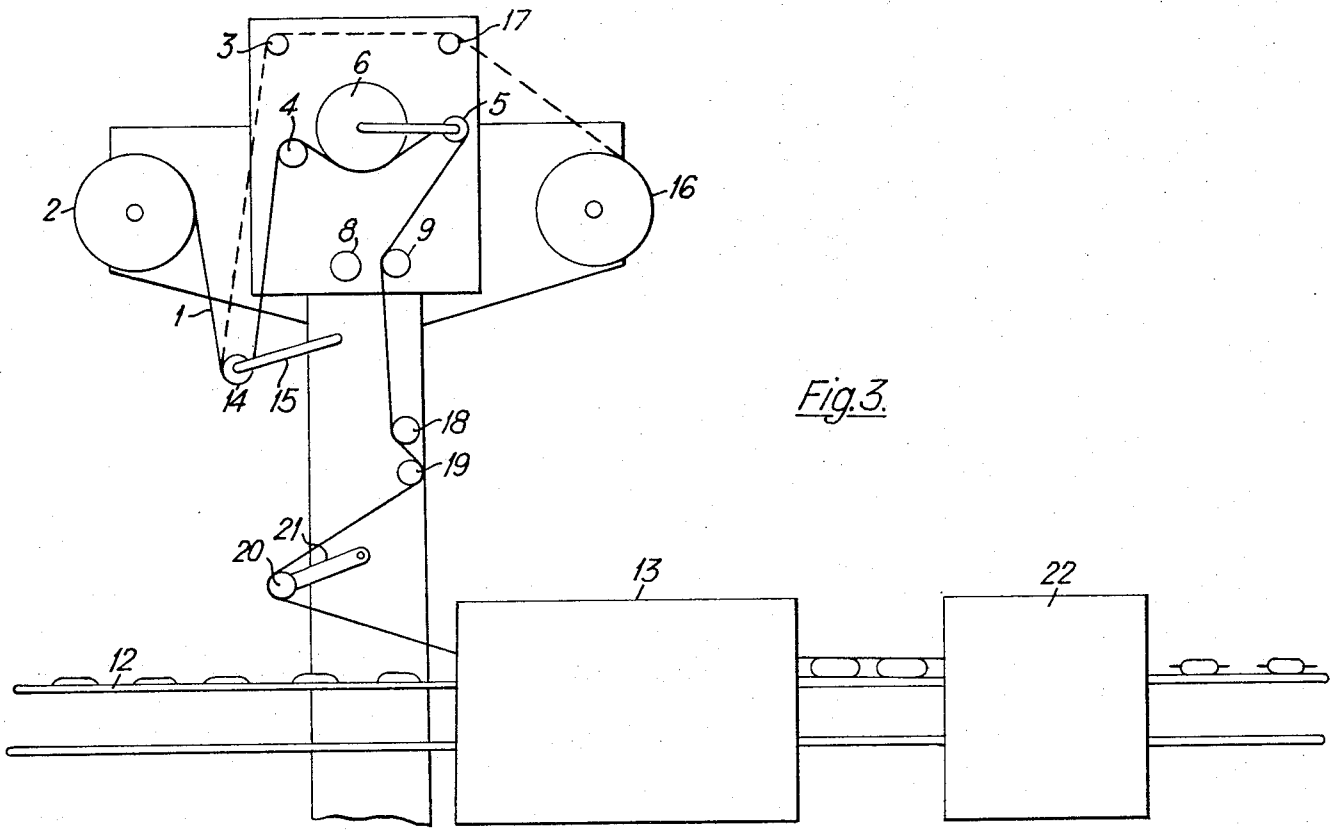

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 12

T920,017

PERFORATION OF THERMOPLASTIC FILMS

Peter Ralph Billinghurst, East End Green, near Hertford, England, assignor to Imperial Chemical Industries Limited, London, England

Continuation of abandoned application Ser. No. 137,841, Apr. 27, 1971. This application Sept. 7, 1973, Ser. No. 395,171

Claims priority, application Great Britain, May 8, 1970, 22,382/70; Feb. 17, 1971, 4,844/71

Int. Cl. B26f *3/10, 1/24*

U.S. Cl. 83—16

2 Sheets Drawing. 14 Pages Specification

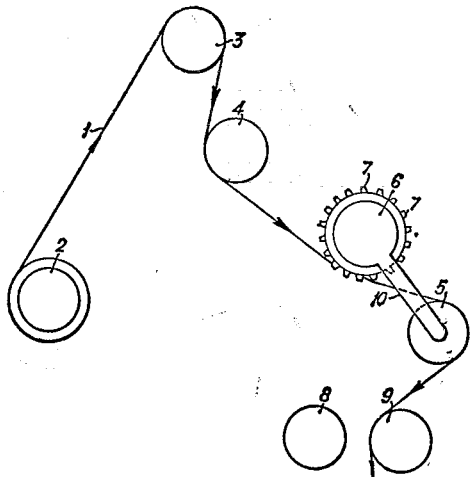

A method of perforating a film of a thermoplastic material comprising passing the film under tension around at least part of the surface of a roller, the surface having a plurality of projections thereon which are arranged in the pattern corresponding to that which is required for the perforations in the film and which are maintained at a temperature sufficient to melt the film, wherein the film is held against the roller solely by virtue of the tension in the film. Apparatus for carrying out this method is also disclosed. The method and apparatus can be used for packaging purposes.

PERFORATION OF THERMOPLASTIC FILMS

Original Filed April 27, 1971 2 Sheets-Sheet 1

PERFORATION OF THERMOPLASTIC FILMS

Original Filed April 27, 1971 2 Sheets-Sheet 2